(12) United States Patent
Cook

(10) Patent No.: US 6,345,942 B1
(45) Date of Patent: Feb. 12, 2002

(54) METHOD AND APPARATUS FOR MITIGATING VIBRATION ASSOCIATED WITH ROTARY CUTTING MACHINE

(76) Inventor: Harold D. Cook, 33642 Via Martos, Dana Point, CA (US) 92629

( * ) Notice: Subject to any disclaimer, the term of this patent is extended or adjusted under 35 U.S.C. 154(b) by 0 days.

(21) Appl. No.: 09/512,936

(22) Filed: Feb. 25, 2000

Related U.S. Application Data

(60) Division of application No. 09/128,067, filed on Aug. 3, 1998, now Pat. No. 6,071,219, which is a continuation-in-part of application No. 08/890,221, filed on Jul. 9, 1997, now Pat. No. 5,975,816.

(51) Int. Cl.$^7$ .............................. B23C 9/00; B23B 47/00
(52) U.S. Cl. ...................... 409/131; 408/1 R; 408/143; 408/226; 409/141; 451/28
(58) Field of Search .................................. 409/141, 131, 409/132, 234, 232, 231; 408/143, 204, 226, 1 R; 279/157, 158; 451/15–28; 188/1 B; 173/104, 139; 82/1.11

(56) References Cited

U.S. PATENT DOCUMENTS

| | | | | |
|---|---|---|---|---|
| 2,596,821 A | * | 5/1952 | Parkins | 408/143 X |
| 2,606,366 A | * | 8/1952 | Stevens | 408/226 |
| 2,641,940 A | * | 6/1953 | White | 408/143 |
| 3,220,030 A | * | 11/1965 | Supernor | 408/143 |
| 3,463,048 A | | 8/1969 | Owsen | |
| 3,662,855 A | * | 5/1972 | Adams et al. | 173/139 |
| 3,774,731 A | * | 11/1973 | Zerb | 408/143 X |
| 3,819,168 A | * | 6/1974 | Nittinger et al. | 408/143 UX |
| 3,838,936 A | * | 10/1974 | Andreassen et al. | 408/143 |
| 3,842,942 A | * | 10/1974 | Jensen | 408/143 UX |
| 3,859,699 A | * | 1/1975 | Lindskog | 408/143 |
| 4,051,905 A | * | 10/1977 | Kleine | 173/104 |
| 4,061,438 A | * | 12/1977 | New | 408/143 |
| 4,068,742 A | * | 1/1978 | Resare | 188/1 B |
| 4,516,658 A | * | 5/1985 | Scarton et al. | 409/141 X |
| 4,551,947 A | * | 11/1985 | Grimm et al. | 451/15 |
| 4,714,389 A | | 12/1987 | Johne | |
| 4,971,491 A | | 11/1990 | Cook | |
| 5,140,739 A | | 8/1992 | Yamaguchi et al. | |
| 5,280,671 A | | 1/1994 | Marquart | |
| 5,322,304 A | | 6/1994 | Rivin | |
| 5,595,391 A | | 1/1997 | Rivin | |
| 5,915,894 A | * | 6/1999 | Okada et al. | 408/204 |

FOREIGN PATENT DOCUMENTS

| | | | | |
|---|---|---|---|---|
| CH | 321980 | * | 7/1957 | 408/226 |
| EP | 90929 | * | 10/1983 | 408/143 |
| EP | 340369 | | 11/1989 | |
| JP | 405337769 | * | 12/1993 | 408/143 |
| SU | 1340921 | * | 9/1987 | 408/143 |
| SU | 1669638 | * | 8/1991 | 408/143 |

* cited by examiner

*Primary Examiner*—William Briggs
(74) *Attorney, Agent, or Firm*—Stetina Brunda Garred & Brucker

(57) ABSTRACT

A method and apparatus mitigates vibration associated with the rotary cutting machines by providing a first dampening member which is disposed around a tool holder and positioned so as to be compressed intermediate the tool holder and spindle of the rotary cutting machine. A cutting tool is shrink fit to the tool holder. A neck is formed in an elongate shank of cutting tool and has dampening material disposed thereabout. The dampening material disposed around the tool holder, the dampening material disposed around the neck, and the shrink fitting of the cutting tool to the tool holder cooperate so as to minimize undesirable vibration of the cutting tool.

10 Claims, 2 Drawing Sheets

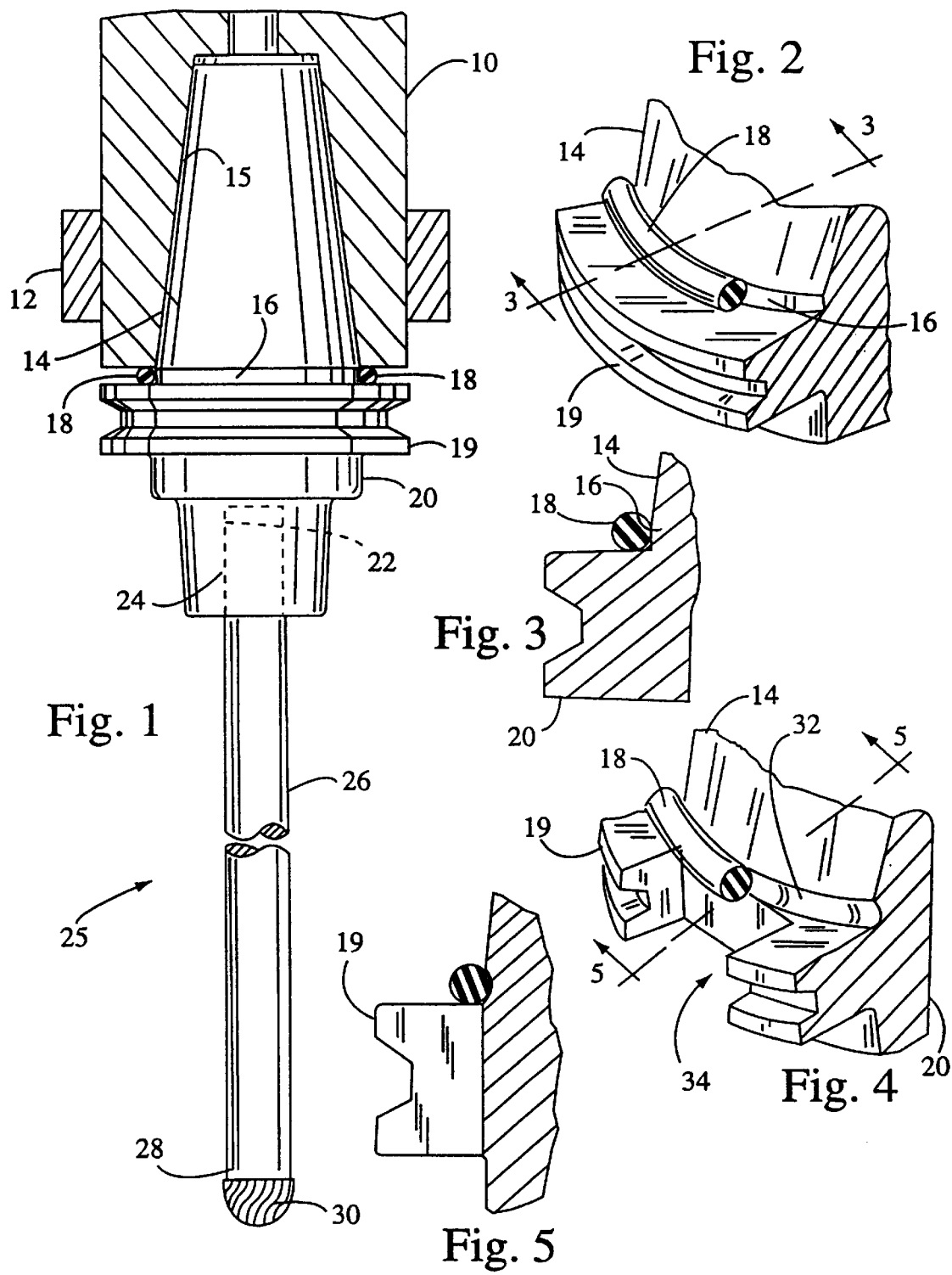

METHOD AND APPARATUS FOR MITIGATING VIBRATION ASSOCIATED WITH ROTARY CUTTING MACHINE

RELATED APPLICATIONS

This application is a divisional of U.S. patent application Ser. No. 09/128,067, filed Aug. 3, 1998, now U.S. Pat. No. 6,071,219, which is a continuation-in-part of U.S. patent application Ser. No. 08/890,221, filed Jul. 9, 1997, now U.S. Pat. No. 5,975,816.

FIELD OF THE INVENTION

The present invention relates generally to rotary cutting machines such as drill presses, lathes, and milling machines and the like. The present invention relates more particularly to a method and apparatus for mitigating vibration of spindles, tool holders, and tools associated with such rotary cutting machines, so as to mitigate the occurrence of undesirable chatter and the like caused by such vibration, thereby facilitating use of such rotary cutting machines at enhanced speeds.

BACKGROUND OF THE INVENTION

Rotary cutting machines such as drill presses, lathes, and milling machines are well known. Such rotary cutting machines are commonly used to cut or remove metal from a workpiece, so as to provide a desired shape to the workpiece. For example, drill presses are typically used to form small to medium size circular openings in a workpiece; lathes are typically used to selectively reduce the diameter of generally symmetric, round workpieces; and milling machines are commonly used to selectively remove material from various shapes of work pieces, including the boring of larger circular openings therein.

Typically such rotary cutting machines are used to perform cutting operations upon metal workpieces. However, those skilled in the art will appreciate that various other materials such as plastics, polymers, and composites, may similarly be shaped. Rotary cutting machines typically comprise a spindle which is caused to rotate by an electric motor or the like. A tool holder attaches to the spindle and is configured to hold the cutting tool which has been selected so as to provide the desired cutting operation upon the workpiece. Generally, such tool holders comprise a central aperture which is configured to receive a shank or elongate shaft portion of the cutting tool. Typically, the tool holder is pulled into the spindle so as to securely hold the cutting tool in place with respect thereto.

Although such contemporary rotary cutting machines have proven generally useful for their intended purposes, the speed with which they operate tends to be undesirably constrained by vibration of the spindle, tool holder, and/or cutting tools associated therewith. More particularly, when either the rotational speed of the cutting tool, the rate at which the cutting tool is advanced with respect to the workpiece, or the depth of the cut being made is increased beyond limits defined by the material of the workpiece, then the cutting tool begins to chatter or vibrate undesirably in a manner which adversely affects the surface finish of the workpiece. Such vibration may also result in more substantial damage to the workpiece and/or the cutting tool if it is permitted to increase in magnitude and/or continues too long.

It will further be appreciated that such vibration of a cutting tool and/or tool holder may result in catastrophic failure of the cutting machine during high speed operations, thereby resulting in potential damage to the workpiece, equipment, and even possible serious injury of nearby personnel.

As those skilled in the art will appreciate, the above mentioned contemporary technique for attaching cutting tools to rotary cutting machines possesses deficiencies which detract from the overall utility of the rotary cutting machine. For example, such attachment of the cutting tool to the tool holder does not assure sufficient concentricity of the cutting tool with respect to the tool holder.

Such a lack of concentricity may result from many factors. For example, dirt, metal shavings, or other contaminants disposed upon either that portion of the cutting tool received within the tool holder or within the bore of the tool holder may cause the cutting tool to be mounted slightly off center. Further, normal manufacturing tolerances of the components of the tool holder may allow slightly off center mounting of the cutting tool.

As those skilled in the art will appreciate, such off center mounting of a cutting tool with respect to the tool holder results in an imbalance of the rotating system defined by the tool holder and the cutting tool. Even a very slight imbalance can cause vibration at high cutting speeds, i.e., high RPM settings of the rotary cutting machine.

As discussed above, such undesirable vibration of the cutting tool causes chatter, thereby resulting in degraded cutting performance, e.g., an undesirable finish of the workpiece and/or reduced cutting speed. Thus, it is desirable to provide for enhanced concentricity of a cutting tool with respect to the tool holder, so as to mitigate such undesirable vibration.

It would further be desirable to provide means for dampening vibration which occurs in the cutting tool and/or tool holder, so as to mitigate the undesirable effects there of. For example, any vibration due to insufficient concentraticity of the cutting tool relative to the tool holder, as well as vibration from any other source, may be dampened so as to reduce the amplitude thereof, thereby mitigating the occurrence of undesirable chatter and facilitating cutting operations at higher speeds.

SUMMARY OF THE INVENTION

The present invention specifically addresses and alleviates the above mentioned deficiencies associated with the prior art. More particularly, the present invention comprises a vibration dampened spindle/toolholder assembly comprising a spindle, a tool holder releasibly attached to the spindle for holding a tool, and an annuler dampening member disposed about the tool holder. The annular dampening member is preferably preloaded or compressed intermediate the tool holder and the spindle. The dampening member dampens vibration of the tool holder relative to the spindle so as to facilitate cutting at enhanced speeds. The dampening member dampens such vibration regardless of the cause of the vibration.

Preferably, the dampening member is configured to define an O-ring. The dampening member preferably comprises rubber, a resilient polymer material, or some desired combination thereof. However, those skilled in the art will appreciate that various other resilient materials are likewise suitable.

Optionally, a groove is formed in the tool holder for receiving a first portion of the dampening member. A second portion of the dampening member is compressed intermediate the tool holder and the spindle. Such a groove is particularly suited for use with rotary cutting machines wherein the spindle comprises one or more flanges and the tool holder comprises a corresponding number of cut-outs. In such rotary cutting machines each cut-out receives a flange so as to maintain desired rotation of the tool holder with respect to the spindle, according to well known principles. In this instance, the tool holder preferably comprises a groove formed thereabout, which receives the first portion of the dampening member, thereby causing the dampening member to be recessed sufficiently to mitigate interference between dampening member and the flanges. Thus, the groove prevents the dampening member form being in the way of, e.g., interfering with, the flanges of the spindle when the tool holder is attached to the spindle.

Further, according to the present invention a cutting tool is attached to the tool holder by heating the tool holder and shrink fitting the cutting tool thereto, so as to maintain the desired concentricity of the cutting tool with respect to the tool holder. In this manner, the generation of vibration due to an imbalance of the cutting tool with respect to the tool holder is mitigated.

Further, according to the present invention, the cutting tool comprises an elongate shank having proximal and distal ends, the proximal end is configured to be received within the tool holder and the distal end optionally has an axial bore formed therein for facilitating attachment of a rotary cutting tool thereto. Alternatively, the rotary cutting tool may be permanently formed or affixed to the elongate shank. Optionally, the elongate shank comprises an extension to which the cutting head of the cutting tool is either permanently or removabley attached.

A neck is formed intermediate the proximal and distal ends of the shank. A dampening member is formed about the neck so as to mitigate vibration thereof in a manner which facilitates use of the rotary cutting tool at enhanced speeds.

According to the preferred embodiment of the present invention, the neck has a diameter which is less than the diameter of the remaining portion of the shank, i.e., the proximal and distal ends thereof. As with the dampening member disposed intermediate the tool holder and the spindle, the dampening member formed about the neck of the shank preferably comprises either rubber, a resilient polymer material, or some combination thereof. Those skilled in the art will recognize that other resilient materials are likewise suitable.

According to the preferred embodiment of the present invention, a cover is formed substantially over the dampening material. The cover preferably preloads or compresses the dampening material. The cover preferably comprises a metal cover and preferably extends beyond the neck, along the shank in both the proximal and distal directions, such that it is attached to the wider diameter portions of the shank at either end of the neck thereof. Attachment of the cover to the shank may be performed by shrink fitting the cover thereto, welding the cover thereto, adhesively bonding the cover thereto, brazing, or soldering. When the shank has a sufficiently large diameter, e.g, in excess of three inches, for example, fasteners such as screws, bolts, etc. may be utilized to attach the cover to the shank.

Thus, three separate features of the present invention may be, and preferably are, utilized simultaneously so as to mitigate vibration of a cutting tool and thus facilitate use at enhanced cutting speeds thereof. Thus, the present invention preferably comprises the use of an annular dampening member disposed about the tool holder and compressed intermediate the tool holder and the spindle; a dampening member formed about the neck of the elongate shank of the cutting tool or extension therefor; and the use of a cutting tool which has been shrink fitted to the tool holder. The dampening member disposed intermediate the tool holder and the spindle mitigates vibration of the tool holder relative to the spindle. The dampening member formed about the neck of the shank of a cutting tool or extension therefor mitigates vibration of the shank. The use of a cutting tool which has been shrink fitted to its associated tool holder assures the desired degree of concentricity of the cutting tool with respect to the tool holder, so as to enhance the balance thereof and thereby mitigate vibration of the cutting tool and tool holder.

Since vibration of the tool holder and/or the shank of the cutting tool is readily transmitted to the cutting head, mitigation of vibration of the tool holder and/or the shank of the cutting tool is desirable since it likewise mitigates vibration of the cutting tool.

As those skilled in the art will appreciate, enhancing the cutting speed of such rotary cutting machines similarly enhances the rate at which products are formed therewith. Such an increase in efficiency thus potentially contributes substantially to profitability and is therefore highly desirable.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a side view of the spindle, tool holder, and rotary cutting tool showing the spindle in cross section and also showing an annular vibration dampening member disposed about the tool holder and compressed intermediate the tool holder and the spindle;

FIG. 2 is a fragmentary perspective view of the tool holder and a portion of the annular dampening member of FIG. 1;

FIG. 3 is an enlarged fragmentary cross-section of the tool holder and annular vibration dampening member of FIG. 2 better showing positioning of the annular vibration dampening member relative to the tool holder;

FIG. 4 is a perspective fragmentary view of an alternative tool holder wherein a groove is formed therein and the annular vibration dampening member is partially disposed within the groove, such that the annular vibration dampening member does not interfere with flanges of a spindle which extend into cut-outs formed in the tool holder;

FIG. 5 is a fragmentary cross-sectional view of the tool holder and the annular vibration dampening member of FIG. 4, better showing the positioning of the annular vibration dampening member within the groove of the tool holder;

DETAILED DESCRIPTION OF THE PREFERRED INVENTION

Figure 6:
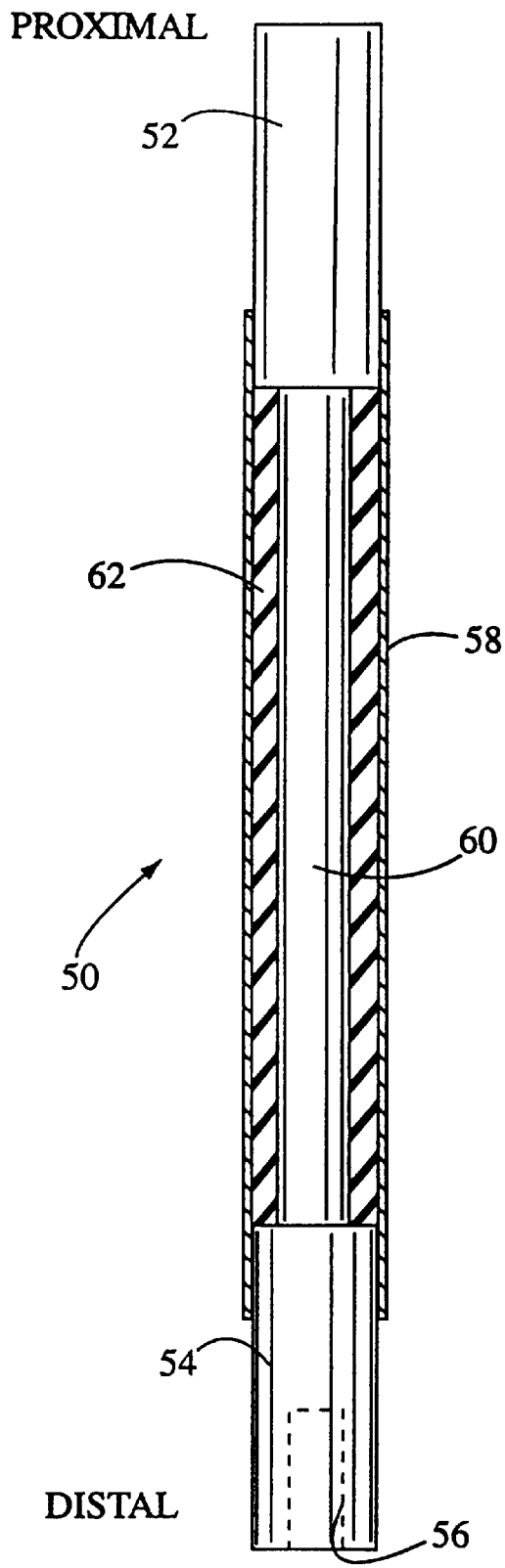
FIG. 6 is a side view, partially in cross-section, of a shank of an extension for a rotary cutting tool, wherein a vibration dampening member is formed about a reduced-diameter neck portion thereof and a cover is formed over the vibration dampening member.

The detailed description set forth below in connection with the appended drawings is intended as a description of the presently preferred embodiment of the invention, and is not intended to represent the only forms in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

The vibration dampened spindle/tool holder and rotary cutting tool assembly of the present invention is illustrated in FIGS. 1–7 which depict a presently preferred embodiment thereof.

Referring now to FIG. 1, the vibration dampened spindle/ tool holder assembly of the present invention comprises a spindle 10, which is a part of a rotary cutting machine such as a milling machine and which is in mechanical communication with an electric motor thereof. Thus, the spindle 10 rotates so as to effect desired cutting. Annular compression ring 12 of the spindle 10 is used to attach the tool holder 20 to the spindle 10 according to well known principles.

The tool holder 20 comprises a conically tapered shank portion 14 which is received within complimentary conically tapered recess 15 of spindle 10.

According to one preferred configuration of the present invention, annular damping member 18, preferably configured as an O-ring, is disposed about circumferential portion 16 of the tool holder 20 such that it is captured between and compressed by the flange portion 19 of the tool holder 20 and the spindle 10.

As those skilled in the art will appreciate, the placement of such an annular dampening member 18 intermediate the spindle 10 and the tool holder 20 will tend to mitigate vibration of the tool holder 20 relative to the spindle 10, as the mechanical energy of such vibration is dampened by repeated compression of the annular dampening member 18. Such dampening occurs according to well known principles as the annular dampening member 18 is repeatedly compressed and released.

According to the preferred embodiment of the present invention, the tool holder 20 comprises a bore 22 configured to receive the proximal end 24 of cutting tool 25.

The cutting tool 25 may optionally comprise an elongate shank 26. Alternatively, the tool may comprise a shortened shank or no shank at all.

A cutting head 30 is either formed to the distal end 28 of the shank 26 or is attachable thereto (as described in further detail below in the discussion of FIGS. 6 and 7).

As those skilled in the art will appreciate, the longer the shank 26 is, the more likely that undesirable vibration will occur therein, as well as in the tool holder 20 and/or the spindle 10 during cutting. Such vibration tends to occur at higher cutting speeds. Since such vibration tends to cause chatter which adversely affects the finish and/or quality of the cut material, the prior art solution is typically to reduce the cutting speed (the rotational speed of the cutting head 30, the depth of the cut, and/or the rate at which the cutting head is advanced toward the workpiece).

As those skilled in the art will appreciate, such reduction in the cutting speed, cut depth and/or feed rate adversely affect the performance of the rotary cutting machine, thereby reducing the amount of material that may be removed in any given length of time.

Referring now to FIGS. 2 and 3, it will be appreciated that the annular dampening member 18 is positioned against the circumferential portion 16 of the tool holder 20 and is trapped between the flange 19 of the tool holder 20 and the lower surface (shown in FIG. 1) of the spindle 10.

Referring now to FIGS. 4 and 5, a groove 32 may optionally be formed within the tool holder 20, such that a portion of the O-ring 18 is received within the groove 32. Such a groove 32 may be beneficial for assuring that the annular dampening member 18 remains in a desired position upon the tool holder 20 when the tool holder 20 is not attached to spindle 10.

Further, as those skilled in the art will appreciate, some contemporary spindles comprise flanges (not shown) which extend downwardly therefrom and which are received within cut outs or openings 34 formed in the flange 19 of a tool holder 20. Such flanges cooperate with the openings 34 of the tool holder 20 to assure positive rotation of the tool holder 20 when the spindle 10 rotates. By forming a groove 32 within the tool holder 20, interference between the annular dampening member 18 and such downwardly extending flanges of the spindle 10 is mitigated.

Figure 7:
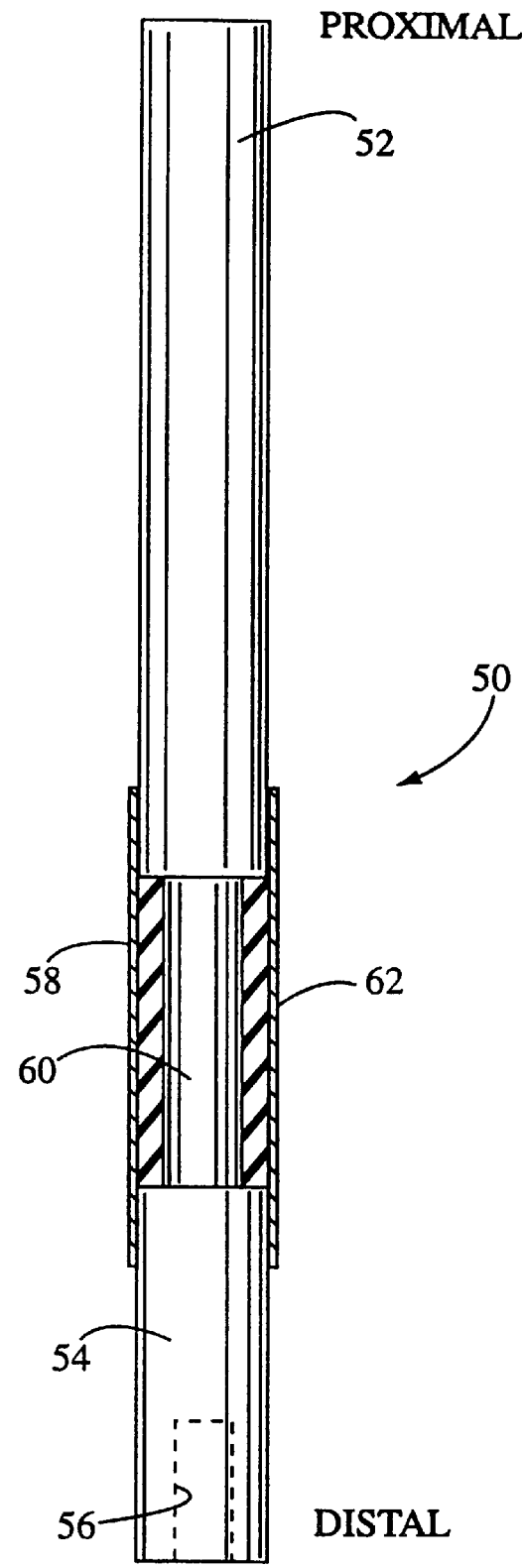
FIG. 7 is a side view, partially in cross-section, of a shank of an extension for a cutting tool, similar to that shown in FIG. 6, wherein the reduced-diameter neck portion comprises a smaller portion of the length of the extension as compared to that of FIG. 6.

Referring now to FIGS. 6 and 7, an extension 50 for a rotating cutting tool is shown. Such an extension 50 may comprise either an extension to which a cutting head is removably attachable, or alternatively, an extension having a cutting head attached or formed permanently thereto. The extension comprises a proximal end 52, a distal end 54, and a neck 60, having a diameter which is substantially less than the diameter of the proximal end 52 and/or the diameter of the distal end 54.

If the extension 50 is configured so as to be attachable to a cutting head (such as that of FIG. 1) a bore 56 is preferably formed in the distal end thereof so as to facilitate such attachment. Those skilled in the art will appreciate that other means for attachment are likewise suitable.

Dampening member 62, which preferably comprises a resilient material such as a polymer or rubber, is formed about the neck 60, preferably such that the outside diameter thereof is approximately equal to the diameter of the proximal end 52 and/or the distal end 54 of the extension 50. The dampening material 62 is preferably compressed between the neck 60 of the extension 50 and a cover 58.

The cover 58 preferably extends beyond the neck 60 in both the distal and proximal directions, and is preferably attached to the extension 50 at the proximal and distal ends of the cover 58, preferably via shrink fitting, welding, adhesive bonding, or any other suitable method.

With particular reference to FIG. 6, the neck 60, as well as the dampening member 62 and the cover 58 may extend substantially from the proximal end 52 to the distal end 54 of the extension 50.

With particular reference to FIG. 7, alternatively the neck 60, as well as the dampening member 62 and the cover 58, may all be generally located at one end e.g., the distal end, of the extension 50. As those skilled in the art will appreciate, the location of the neck 60, dampening material 62, and the cover 58 will depend upon where along the extension 50 vibration must be dampened so as to minimize undesirable vibration of the cutting head.

Like the annular dampening member 18, the dampening member 62 function according to well known principles to dampen vibration of the extension 50. As those skilled in the art will appreciate, the dampening member 62 is repeatedly compressed and released as the extension 50 bends and flexes due to vibration thereof.

According to the preferred embodiment of the present invention, the proximal end of the shank 26 (which optionally comprises an extension such as extension 50 of FIGS. 6 and 7) is shrink fitted to the tool holder 20 by heating the tool holder 20 so as to expand the diameter of bore 22, inserting the distal end of the shank 26 into the bore 22, and allowing the tool holder 20 to cool such that it firmly grasps and attaches to the shank 26. The shank 26 is sized to have a diameter slightly greater than the room temperature diameter of the bore 22, such that upon cooling, the tool holder 20 is firmly attached thereto. As those skilled in the art will appreciate, such shrink fitting of the tool holder 20 to the shank 26 of a rotary cutting tool maintains a desired degree of concentricity of the cutting tool with respect to the tool holder 20. This desired concentricity enhances the balance of the cutting tool 25, so as to mitigant undesirable vibration thereof.

According to the preferred embodiment of the present invention, all three features, i.e., the dampening member located intermediate the spindle 10 and the tool holder 20, the dampening member formed about the neck 60 of the extension 50, and the use of a shrink fit attachment of the cutting tool 25 to the tool holder 20 are utilized simultaneously, so as to mitigate vibration.

In operation, the annular dampening member 18 mitigates vibration of the tool holder 20 relative to the spindle 10, the dampening member 62 mitigates undesirable vibration of the extension 50 or shank 26 of the cutting tool 25, and the use of the shrink fit attachment of the tool holder 20 to the cutting tool 25 mitigates vibration of the cutting tool 25 and the tool holder 20.

Thus, according to the present invention, vibration of the cutting head 30 is mitigated, so as to facilitate operation thereof at higher rotational speeds, deeper cuts, and higher feed rates. As those skilled in the art will appreciate, operation at higher rotational speeds, deep cuts, and higher feed rates enhances the efficiency of such a rotary cutting machine, thereby reducing the costs associated with production.

It is understood that the exemplary vibration dampened spindle/tool holder assembly and rotary cutting tool of the present invention described herein and shown in the drawings represents only presently preferred embodiments of the invention. Indeed, various modifications and additions may be made to such embodiments without departing from the spirit and scope of the invention. For example, those skilled in the art will appreciate that various different configurations of cutting tools and tool holder are possible. Indeed, the cutting tool may be integrally formed with the tool holder. Further, various different means for attaching the tool holder to the spindle are contemplated. Thus, these and other modifications and additions may be obvious to those skilled in the art and may be implemented to adapt the present invention for use in a variety of different applications.

What is claimed is:

1. A method for using a rotary cutting machine at enhanced speed, the method comprising the steps of:
   a) attaching a cutting tool to a tool holder, the cutting tool having an elongate non-apertured shank having proximal and distal ends, the proximal end being received within the tool holder and the distal end having a cutting head formed thereon, a neck being formed intermediate the proximal and distal ends of the shank;
   b) rotating the tool holder with a rotary cutting machine to which the tool holder is attached; and
   c) mitigating vibration of the cutting tool with a dampening member non-adheredly disposed only about the neck thereof so as to facilitate use of the cutting machine at enhance speed, said dampening member fabricated of a dampening material and compressed between the neck only and an exterior cover disposed over the dampening material.

2. A tool holder/cutting tool assembly for use with a rotary cutting machine having a spindle, the tool holder/cutting tool assembly comprising:
   a) a tool holder releasably attachable to the spindle;
   b) a first dampening member disposed about the tool holder and positioned so as to be compressed intermediate the tool holder and the spindle;
   c) an elongate non-apertured cutting tool shank having a proximal end thereof attached via shrink fit to the tool holder, the cutting tool shank having a cutting head formed at a distal end thereof;
   d) a neck formed intermediate the proximal and distal ends of the cutting tool shank, the neck having a diameter which is less than a diameter of at least one of the proximal and distal ends of the cutting tool shank;
   e) a second dampening material non-adheredly disposed around the neck only of the cutting tool shank; and
   f) a cover over the second dampening material such that the second dampening material is compressed intermediate the neck and the cover.

3. A dampened extension shank for a rotary cutting tool for use with a rotary cutting machine at enhanced speed, the extension shank comprising:
   a) an elongate non-apertured shank having proximal and distal ends, the proximal end being configured to be received within a tool holder and the distal end having an axial bore formed therein for facilitating attachment of a cutting head thereto;
   b) a neck formed intermediate the proximal and distal ends of the shank; and
   c) a one-piece dampening member non-adheredly disposed about the neck only for mitigating vibration of the shank, said dampening member fabricated of a dampening material and compressed between the neck and an exterior cover disposed over the dampening material.

4. The extension shank as recited in claim 3, wherein the neck has a diameter which is less than a diameter of at least one of the proximal and distal ends of the shank.

5. The extension shank as recited in claim 3, wherein the dampening material is chosen from rubber and a resilient polymer material.

6. The extension shank as recited in claim 4, wherein the cover comprises a metal cover.

7. A rotary cutting tool for use with a rotary cutting machine at enhanced speed, the rotary cutting tool comprising:
   a) an elongate non-apertured shank having proximal and distal ends, the proximal end being configured to be received within a tool holder and the distal end having a cutting head formed thereon;
   b) a neck formed intermediate the proximal and distal ends of the shank; and
   c) a dampening member non-adheredly disposed about the neck only for mitigating vibration of the shank, said dampening member fabricated of a dampening material and compressed between the neck and an exterior cover disposed over the dampening material.

8. The rotary cutting tool as recited in claim 7, wherein the neck has a diameter which is less than a diameter of at least one of the proximal and distal ends of the shank.

9. The rotary cutting tool as recited in claim 7, wherein the dampening material comprises at least one of rubber and a resilient polymer material.

10. The rotary cutting tool as recited in claim 8, wherein the cover comprises a metal cover.

* * * * *